Sept. 1, 1964 R. W. WARFIELD 3,147,432
METHOD FOR MEASURING THE HEAT DISTORTION TEMPERATURE OF
RESINS, PLASTICS AND HIGH POLYMERS
Filed March 8, 1960 3 Sheets-Sheet 1

INVENTOR.
R. W. WARFIELD
ATTYS.

Sept. 1, 1964 R. W. WARFIELD 3,147,432
METHOD FOR MEASURING THE HEAT DISTORTION TEMPERATURE OF
RESINS, PLASTICS AND HIGH POLYMERS
Filed March 8, 1960 3 Sheets-Sheet 3

INVENTOR.
R. W. WARFIELD

ATTYS.

United States Patent Office 3,147,432
Patented Sept. 1, 1964

3,147,432
METHOD FOR MEASURING THE HEAT DISTORTION TEMPERATURE OF RESINS, PLASTICS AND HIGH POLYMERS
Robert W. Warfield, Hyattsville, Md., assignor to the United States of America as represented by the Secretary of the Navy
Filed Mar. 8, 1960, Ser. No. 13,667
1 Claim. (Cl. 324—65)
(Granted under Title 35, U.S. Code (1952), sec. 266)

The invention described herein may be manufactured and used by or for the Government of the United States of America for governmental purposes without the payment of any royalties thereon or therefor.

This invention relates to a method for determining the heat distortion temperature of resins, plastics and high polymers.

The old method of determining the heat distortion temperature, a well known and useful parameter of such materials as approved by the American Society for Testing materials consisted of subjecting a machined test bar while suspended at each end and immersed in an oil bath to a centered load designed to give a uniform fiber stress of 264 p.s.i. The temperature of the oil bath was then raised at a rate of 2° C. per minute and when the deflection of the test bar reached 0.010 inch, the temperature of the oil bath was reported as the heat distortion temperature of the sample. Sometimes the standard deflection of the test bar occurs over a temperature range instead of at a precise point.

The old method set out is disadvantageous in that it requires a carefully machined test bar, in that the temperature of the oil bath is restricted to no more than about 150° C. with current apparatus available and in that the test is rather cumbersome to carry out, and moreover the method is imprecise, due to the property measured.

It is therefore an object of this invention to provide a method for determining the heat distortion temperature of solid resins, plastics, and high polymers which does not require a machined test bar.

Another object of this invention is to provide such a method which is useful over a much broader temperature range than was the old method with the apparatus available.

Yet another object is to provide a more precise method of determining the heat distortion temperature of resins, etc.

Still another object is to provide a simpler and less expensive method for determining the heat distortion temperature of polymers, resins, etc.

Other objects and many of the attendant advantages of this invention will be readily appreciated as the same becomes better understood by reference to the following detailed description when considered in connection with the accompanying drawings wherein.

Figure 6:
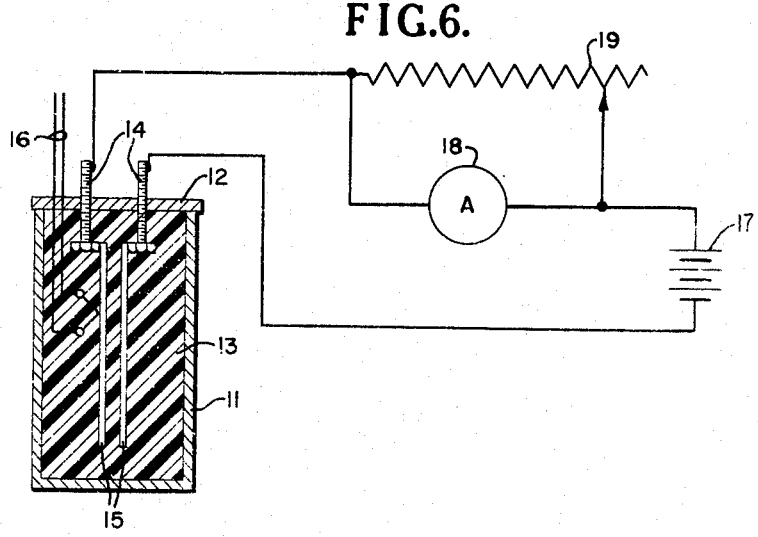
FIG. 6 is a view, partly in cross-section and partly in diagram of apparatus employed in the present invention.

Referring now to the drawings, there is shown in FIG. 6 a container 11 having a cover plate 12 which has a plurality of apertures therein including a pair of threaded apertures. Positioned in and substantially filling container 11 is a quantity of resinous, plastic, or polymeric material 13. Bolts 14 are threaded and in engagement with the threads of the apertures of plate 12 such that the heads of the bolts protrude below plate 12 and inside the container while a substantial portion of each bolt protrudes above plate 12 and outside the container. Plates 15 are equal in size and are attached to the heads of the bolts, each plate to its corresponding bolt, and are positioned in a physically spaced parallel coincidental relationship. Thermocouple 16 is positioned so as to measure the temperature at a point adjacent one of the parallel plates 15 at a point substantially below the level of cover plate 12. The portions of members 14 and 16 which protrude into container 11, as well as plates 15, are imbedded in material 13.

The portions of bolts 14 which protrude outside cover plate 12 serve as points of contact for a circuit which contains a battery 17, an ammeter 18 and a shunt 19 for adjusting the amount of current going through the ammeter.

The objects of the invention are accomplished by measuring the electrical resistivity of test materials continually over broad temperature ranges, measuring the temperatures corresponding to each such resistivity, and plotting such resistivities as functions of temperatures until marked changes of slope occur.

A transition from a hard glassy solid to a soft flexible rubbery solid takes place in a cured amorphous resin, plastic, or high polymer, as its temperature is raised from below the transition point, which varies with the nature of the solid, its molecular weight and degree of branching or cross-linking. The point, or range, at which this transition occurs is called the glass transition or second order transition temperature of the material. Applicant has discovered that the heat distortion temperature, as measured by the prior art method described (A.S.T.M. method) is related to the second order or glass transition temperature occurring in polymers etc. It is thought that some basic change in the mechanism of the electrical conduction process causes the marked change in slope of the resistivity versus temperature plots.

According to the instant method, liquid uncured materials, and catalysts, if any, are mixed and then polymerized in situ about a parallel pair of plates and a temperature measuring device.

Then the temperature of the polymerized material is slowly raised and periodic measurements of the resistivity of the sample and its temperature are made. Resistivity is then plotted on a set of coordinates as a function of temperature, such plotting being kept up until the curve develops a marked change in slope. The point at which the change occurs is then taken as the heat distortion temperature.

FIGS. 1–4 show plots prepared for a number of materials according to the instant method which exhibit the characteristic marked changes in slope. In each case the semi-logarithmic plots of resistivity versus temperature display the characteristic changes in slope, each such change corresponding to a precise temperature.

Figure 1:
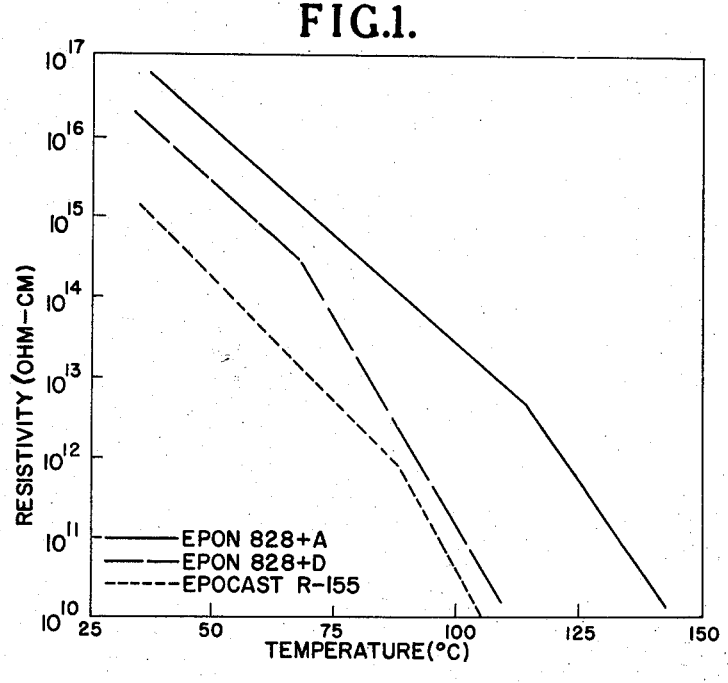
FIGS. 1–4 are plots prepared from data which illustrate the invention.
Figure 2:
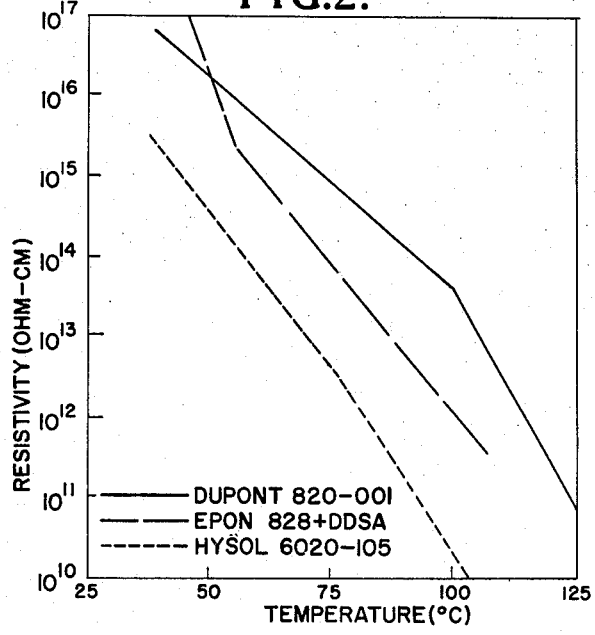
Figure 3:
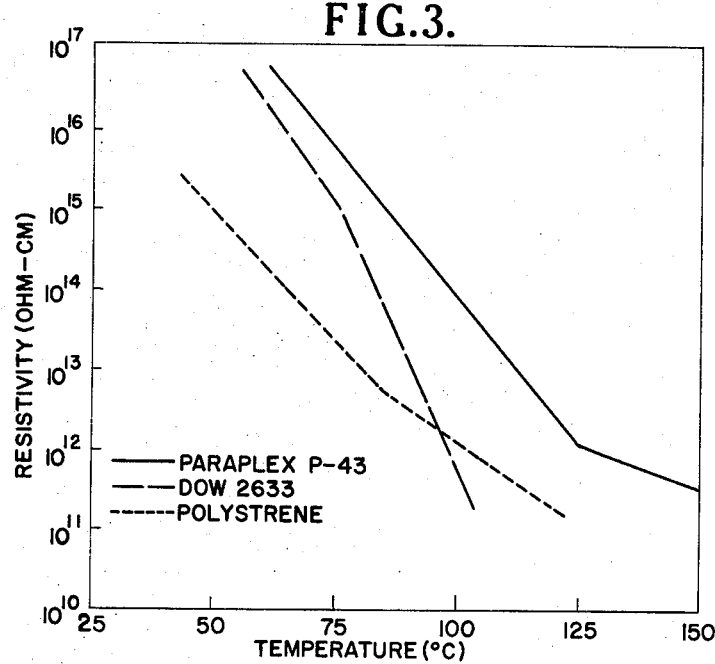
Figure 4:
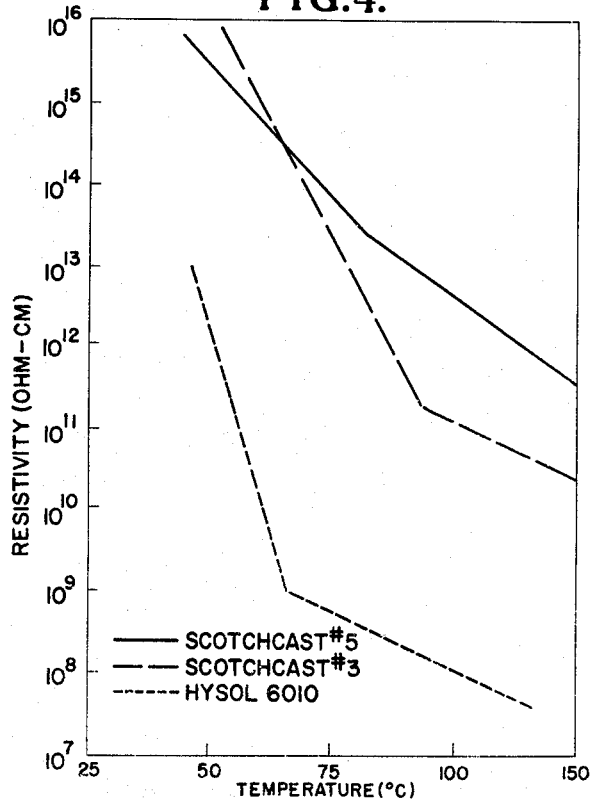
Figure 5:
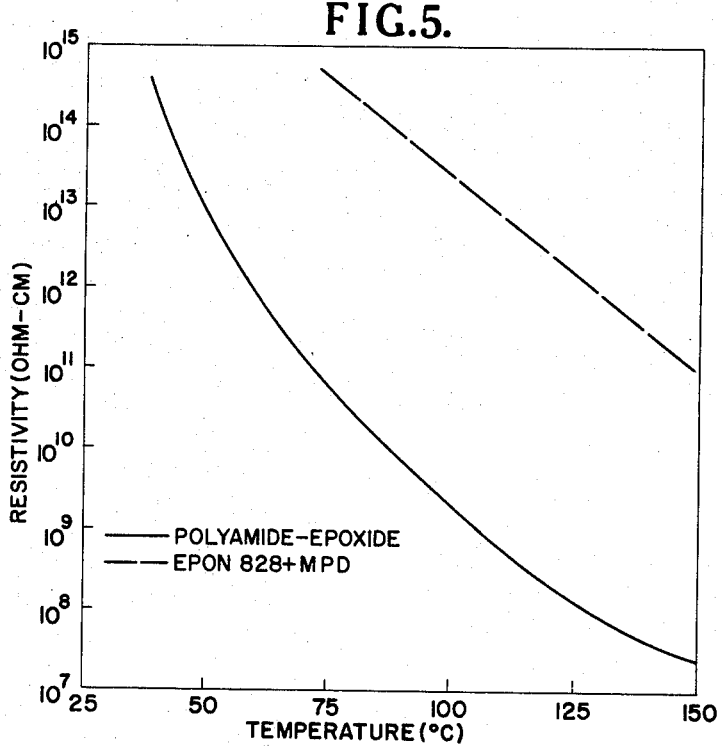
FIG. 5 is a plot prepared from data which does not show the behavior characteristic of the invention.

FIG. 5 shows plots prepared for two materials according to the instant method which fail to display the characteristic changes in slope obtained with the materials of FIGS. 1–4. Presumably no change in the mechanism of electrical conduction takes place over the temperature range investigated.

In Table 1 is presented comparative data which illustrate the close agreement between the heat distortion temperature as determined by the A.S.T.M. method outlined previously and the glass transition temperature as determined by the instant method. As an added comparison, the glass transition temperature as determined by specific heat measurements, which are old and well known, is also shown.

*Table 1*

| Polymer | Glass Transition Temp. | | Heat Distortion Temp. By A.S.T.M. Method, °C. |
|---|---|---|---|
| | By Resistivity, °C. | By S.P. Heat, °C. | |
| Epon 828*+A [1] | 110 | 60-115 | 97 |
| Epon 828*+D [2] | 66 | 40-66 | 64 |
| Epon 828*+DDSA [3] | 54 | 40-66 | 60 |
| Epon 828*+MPDA [4] | 158 | | 159 |
| Epon 828*+DETA [5] | 92 | | 91 |
| Polystyrene | 82 | 82 | 85 |
| Scotchcast** #3 | 76 | | 68 |

[1] Diethylaminopropylamine, 5.65%.
[2] Tris(dimethylaminomethyl)phenol tri(2-ethyl hexoate), 11.5%.
[3] Dodecenyl succinic anhydride, 56.5%.
[4] m-Phenylene diamine, 12.6%.
[5] Diethylene triamine, 9.1%.
*Epoxide polymer manufactured by Shell Chemical Co.
**Epoxide polymer manufactured by Minnesota Mining & Mfg. Co.

It is readily apparent that good agreement exists between values obtained for the glass transition temperature by resistivity and the heat distortion temperature obtained by the A.S.T.M. method.

It is preferable to use the apparatus shown in FIG. 6 in which the liquid uncured material is poured into container 11, cover plate 12, and parts attached, put into place and the material cured in situ. Good contact between the cured material and the plates 15 results and contact resistance is negligible. Then the circuit is connected to bolt 14, and container 11 plus contents are put in a small oven and heated at a rate of about 15° C. per hour.

Battery potential is known and the current flowing in the circuit is measured with ammeter 18, and the resistance across plates 15 is calculated from Ohm's Law. Resistance across plates 15 may be measured directly with an ohmmeter however. The resistance across plates 15 is multiplied by the ratio $A/L$ to obtain resistivity where $A$ is the surface area normal to the current flow and $L$ is the perpendicular distance between the plates. Plates 15 may be constructed so as to include only a unit cube of material between them, in which case the resistance would be equal numerically to the resistivity.

In plotting it is more convenient to use a semi-logarithmic scale of the resistivity of the sample rather than the resistivity itself due to the linearity of the resulting curve.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent of the United States is:

The method of precisely indicating the heat distortion temperature of resins, plastics and polymers which comprises slowly heating a test sample, continuously measuring the electrical volume resistivity of said sample by the application of a direct electric current thereto and simultaneously measuring the temperature at which the electrical volume resistivity measurements are taken, to thereby determine the temperatures at which changes in the electrical volume resistivity occur, plotting the logarithm of the resistivity of said sample against the corresponding temperature of the heat applied thereto, and drawing a line connecting the plotted points obtained by the last named step to produce a curve characterized by a sudden change of slope, the point at which said change in slope occurs being indicative of the heat distortion temperature of the sample.

References Cited in the file of this patent

UNITED STATES PATENTS

| | | |
|---|---|---|
| 1,184,837 | Edgecomb | May 30, 1916 |
| 2,264,968 | De Forest | Dec. 2, 1941 |
| 2,316,872 | Kernen | Apr. 20, 1943 |
| 2,477,348 | Postal | July 26, 1949 |
| 2,638,529 | Gard | May 12, 1953 |

OTHER REFERENCES

McKinnon: "A Combined Dilatometer and Electrical Resistivity Apparatus for Studies in Powder Metallurgy," Journal of Scientific Instruments, volume 31, October 1954, pages 383–385.